United States Patent [19]

Dumar, Jr. et al.

[11] 4,343,499
[45] Aug. 10, 1982

[54] BALL JOINT FLEXIBLE WEAR RING AND SEAL

[75] Inventors: William L. Dumar, Jr., Bellevue; Jimmie E. Ledlow, Seattle, both of Wash.

[73] Assignee: The Boeing Company, Seattle, Wash.

[21] Appl. No.: 160,035

[22] Filed: Jun. 16, 1980

[51] Int. Cl.³ .............................................. F16L 27/06
[52] U.S. Cl. .................................. 285/263; 285/334.4
[58] Field of Search ...................... 285/340, 263, 334.4, 285/16, 15, 261

[56] References Cited

U.S. PATENT DOCUMENTS

| 1,568,649 | 1/1926 | Woodruff . | |
|---|---|---|---|
| 1,799,834 | 4/1931 | Waterman | 285/340 |
| 2,703,722 | 3/1955 | Christophersen | 285/340 |
| 2,949,320 | 8/1960 | Low et al. . | |
| 3,033,595 | 5/1962 | Bard . | |
| 3,273,919 | 9/1966 | Billeter et al. | 285/340 |
| 3,357,723 | 12/1967 | Dumont et al. . | |
| 4,273,363 | 6/1981 | Angel | 285/263 X |

FOREIGN PATENT DOCUMENTS 2205514  8/1973  Fed. Rep. of Germany ... 285/334.4

*Primary Examiner*—Thomas F. Callaghan
*Attorney, Agent, or Firm*—Morris A. Case; Bernard A. Donahue

[57] ABSTRACT

A ball joint has a flange and nut with matching spherical surfaces in the seal area of the joint. A frusto-conical wear ring seals between the matching surfaces with an inner and an outer line of contact between the ring and the surfaces to provide a spring type seal.

3 Claims, 6 Drawing Figures

BALL JOINT FLEXIBLE WEAR RING AND SEAL

BACKGROUND OF THE INVENTION

On aircraft there are numerous ducts to handle the flow of air from the engine to various air systems such as the airconditioner or the thermal anti-icing system. The space is limited and the ducts must be flexible so ball joints are used to obtain the flexibility. These ducts operate at temperatures from ambient up to about 940° F. and operate under pressures from atmospheric to 8 psi. when the engine is at idle and up to about 600 psi. at takeoff. In addition to this the ducts are subjected to considerable vibration. Due to these conditions, the ball joint is sealed with a metal wear ring. The old style metal wear ring has a spherical surface on each side to match the closure surfaces on nut and flange. The wear ring, being spherical and of a consistant thickness, is not compressible and is incapable of compensating for variations in the mating nut and flange due to distortions caused by normal fabrication and assembly requirements. The only past method for reducing leakage was by excessive tightening of the nut and flange which defeated the flexibility requirement and, if truly excessive, could cause premature fatigue failure on the duct. Generally the joint would "wear-in" in service and reduce leakage instead of becoming worse. When a wear ring must be replaced it takes considerable time to disassemble to get to the leaking ball joint and the wear ring must be split to permit removal of the faulty ring and to permit the installation of a new ring.

A metal wear ring was discovered that prevents leaks in the air duct ball joints.

SUMMARY OF THE INVENTION

A ball joint has a pair of surfaces to be sealed that are of matching spherical shape. A frusto-conical wear ring, set at a smaller angle than the spherical surfaces, provides a spring effect with line of contact sealing on opposite edges.

It is an object of this invention to provide a positive seal for ducting ball joints that are subjected to high vibration, high temperature, and pressure variations.

DETAILED DESCRIPTION

Figure 2:
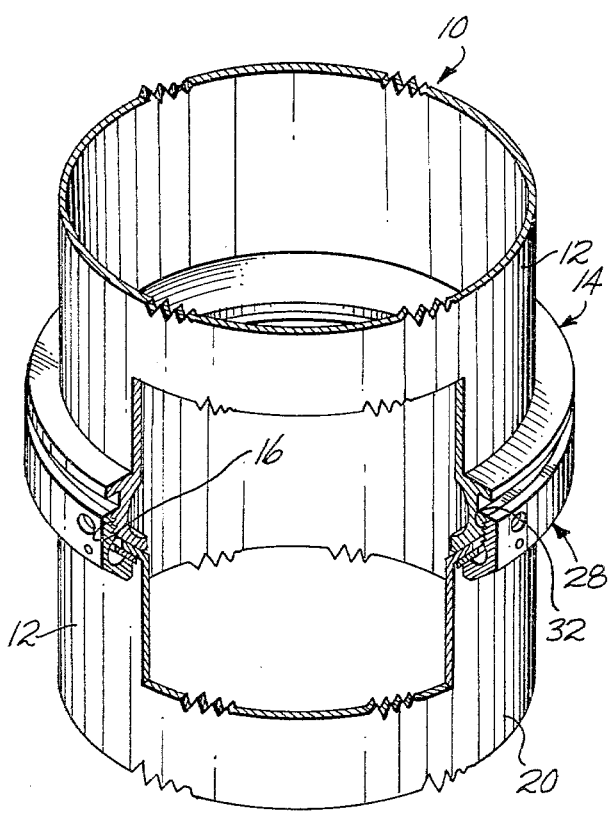
FIG. 2 shows a perspective view, partially cut away, of the assembled ball joint of this invention.
Figure 1:
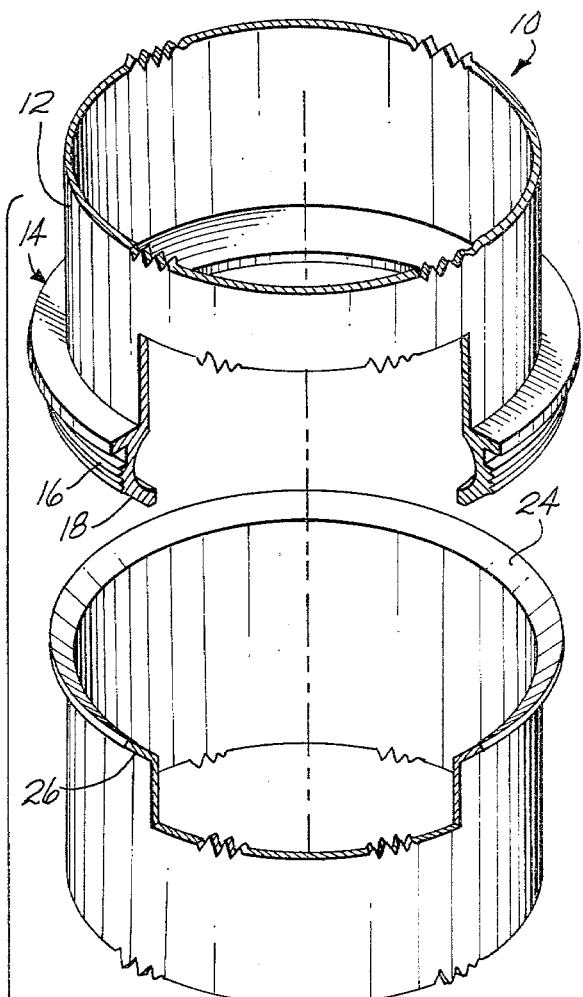
FIG. 1 shows an exploded perspective view of the ball joint of this invention.
Figure 4:
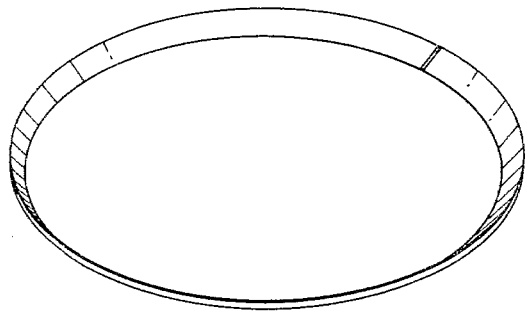
FIG. 4 shows a perspective view of the prior art wear ring shown in FIG. 3.
Figure 3:
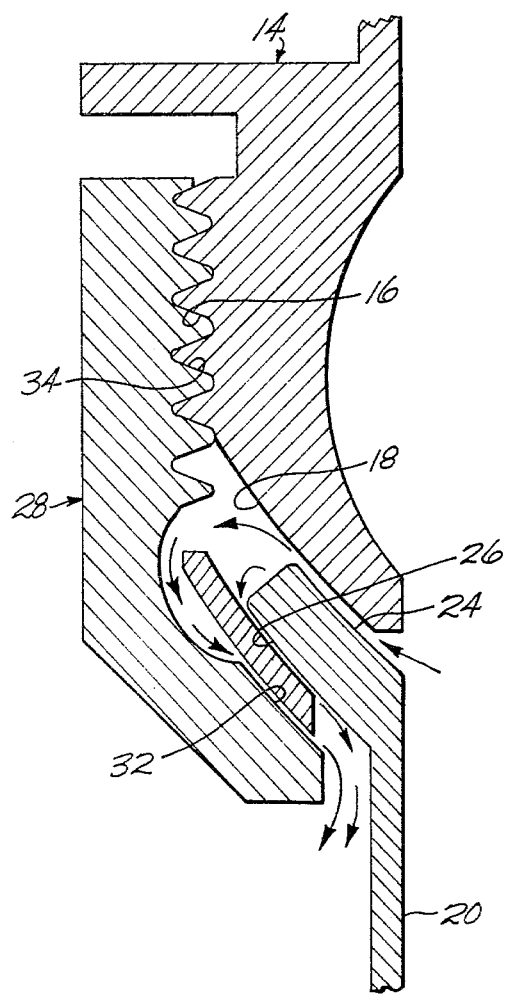
FIG. 3 shows a blown up side elevational sectional view of a prior art ball joint.
Figure 5:
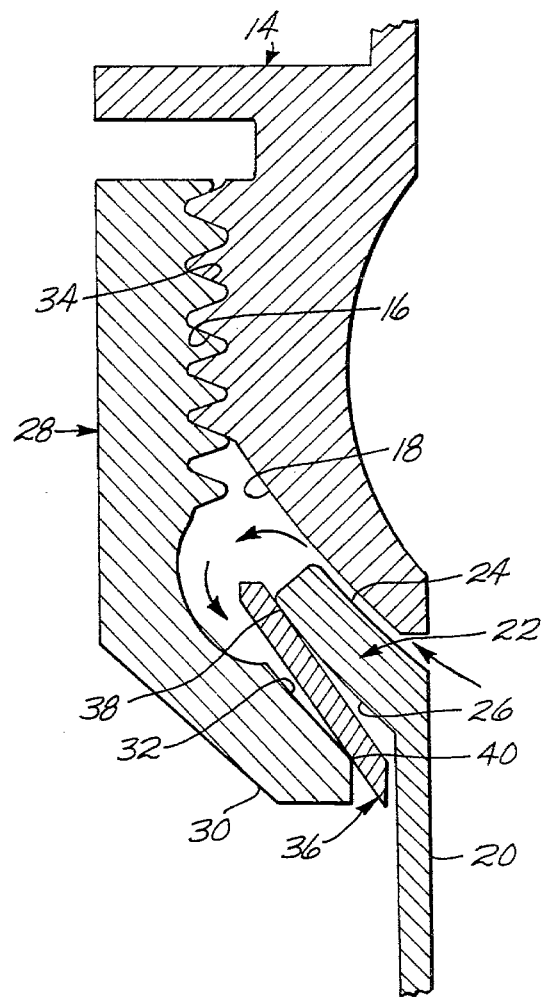
FIG. 5 shows a blown up side elevational sectional view of the invention of FIG. 1.
Figure 6:
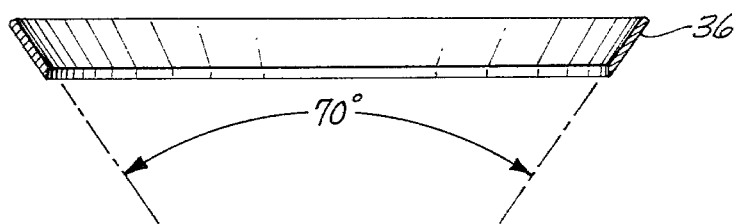
FIG. 6 shows a side elevational view of the wear ring shown in FIG. 1.

Ducting ball joint 10 has a section of duct 12 to which is joined a connector 14. The connector has threads 16 and an end section with a spherical outer surface 18. Tubing or ducting 20 has a flange 22 on the end. This flange extends outward at an angle of about 80° and has an inside surface 24 that is spherical to match the surface on the connector. It also has a spherical surface 26 on the outside of the flange. A nut 28 has an inwardly directed extension 30 that has a spherical surface facing 32 that matches the spherical surface on the outside of the flange and is threaded at 34 to mesh with the threads on the connector. Located between the flange and the nut is a wear ring 36 that is frusto-conical in shape and extends at an angle of about 70°.

To assemble, the nut 28 is placed with threads 34 meshing with threads 16 of the connector. As the nut is tightened, the wear ring 36 acts as a spring and makes a line of contact seal at 38 adjacent the outer diameter of the flange 22 and extends across to make a second line of contact seal at 40 adjacent the inner diameter of the extension 30 of the nut.

We claim:

1. A sealed spherical coupling joint for ducting comprising: a retainer joined to one section of ducting and having a spherical outer surface; a flange joined to a second section of ducting with the flange having a spherical inner surface to match the retainer outer surface and a spherical outer surface; a retainer nut for joining the flange to the retainer with the nut having an extension with an inner spherical surface to match the outer surface on the flange; and a frustoconical shaped wear ring located between the flange and the nut and angled outward to provide a pair of spaced apart line of contact seals with one line of contact of the wear ring adjacent the inner minimum diameter of the nut extension and the other line of contact of the wear ring adjacent the outer maximum diameter of the flange.

2. A ball joint for sealing a fluid under conditions of high vibration and of high temperature and pressure variations, with the joint comprising: a retainer joined to one section and having a spherical outer surface, a flange mounted to a second section to be joined with the flange having a spherical inner surface to match the retainer outer surface and having a spherical outer surface, a retainer nut for joining the flange to the retainer with the nut having an extension with an inner spherical surface to match the outer spherical surface on the flange, and a wear ring frusto-conical shaped and formed at an angle to make line contact near the inner minimum diameter of the extension on the nut and line contact near the outer maximum diameter of the flange.

3. A ball joint as in claim 2 wherein the angle forming the frusto-conical wear ring seal is at about 70 degrees.

* * * * *